(12) United States Patent
Sugiyama (10) Patent No.: US 12,141,400 B2
(45) Date of Patent: Nov. 12, 2024

(54) INPUT DETECTION DEVICE, INPUT DETECTION METHOD, AND RECORDING MEDIUM RECORDING AN INPUT DETECTION PROGRAM FOR ACCURATELY DETECTING AN INPUT POSITION OF AN INPUT OPERATION ON A DISPLAY PANEL

(71) Applicant: SHARP KABUSHIKI KAISHA, Sakai (JP)

(72) Inventor: Koichi Sugiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/382,631

(22) Filed: Oct. 23, 2023

(65) Prior Publication Data
US 2024/0176452 A1 May 30, 2024

(30) Foreign Application Priority Data
Nov. 30, 2022 (JP) ................. 2022-191263

(51) Int. Cl.
*G06F 3/044* (2006.01)
*G06F 3/041* (2006.01)
*G06F 3/042* (2006.01)

(52) U.S. Cl.
CPC ........ *G06F 3/04186* (2019.05); *G06F 3/0412* (2013.01); *G06F 3/042* (2013.01); *G06F 3/044* (2013.01); *G06F 3/04166* (2019.05); *G06F 3/0418* (2013.01); *G06F 3/0425* (2013.01); *G06F 3/0446* (2019.05)

(58) Field of Classification Search
CPC .... G06F 3/04186; G06F 3/0412; G06F 3/042; G06F 3/044; G06F 3/04166; G06F 3/0418; G06F 3/0425; G06F 3/0446
See application file for complete search history.

(56) References Cited

U.S. PATENT DOCUMENTS

| | | | | |
|---|---|---|---|---|
| 2010/0245289 | A1* | 9/2010 | Svajda | G06F 3/0421 345/175 |
| 2012/0050211 | A1* | 3/2012 | King | G06F 3/041662 345/174 |
| 2014/0267154 | A1 | 9/2014 | Yamaguchi et al. | |
| 2015/0331536 | A1* | 11/2015 | Miyakawa | G06F 3/04186 345/173 |

FOREIGN PATENT DOCUMENTS

JP    2014-178868 A    9/2014

\* cited by examiner

*Primary Examiner* — Adam J Snyder
(74) *Attorney, Agent, or Firm* — ScienBiziP, P.C.

(57) ABSTRACT

A display device includes: a capacitance detection processing unit that detects a change in electrostatic capacitance of a display panel due to an input operation; an image acquisition processing unit that acquires a captured image from an imager that captures an image of the inputter performing the input operation; and a position detection processing unit that detects the input position on the display panel, based on a change in the electrostatic capacitance, which is detected by the capacitance detection processing unit, and the captured image, which is acquired by the image acquisition processing unit.

6 Claims, 8 Drawing Sheets

INPUT DETECTION DEVICE, INPUT DETECTION METHOD, AND RECORDING MEDIUM RECORDING AN INPUT DETECTION PROGRAM FOR ACCURATELY DETECTING AN INPUT POSITION OF AN INPUT OPERATION ON A DISPLAY PANEL

INCORPORATION BY REFERENCE

This application is based upon and claims the benefit of priority from the corresponding Japanese Patent Application No. 2022-191263 filed on Nov. 30, 2022, the entire contents of which are incorporated herein by reference.

BACKGROUND

The present disclosure relates to an input detection device, an input detection method, and a recording medium recording an input detection program that detect an input position of an inputter on a display panel.

Conventionally, a display device that allows an input operation (a screen operation), such as an instruction operation, performed in a non-contact manner on a display screen of a display panel has been known. In addition, in a system that performs a non-contact instruction operation (hover operation) using an electrostatic capacitive touch panel, in order to prevent an operation due to an operation unintended by a user, a technique is known in which coordinates of the center of an area occupied by an indicator (for example, a finger of the user) are valid in a case where an oblateness of the area is smaller than a threshold value, and the coordinates of the center of the area are invalid in a case where the oblateness is larger than the threshold value.

However, in the related art, when a distance between the touch panel and an indicator is large, it is difficult to accurately detect an input position. In addition, in order to make it possible to detect an indicator separated from the touch panel, a configuration in which a plurality of electrodes (drive electrodes) are connected to each other and form an electrode block, and a driving signal is input for each electrode block is also considered. However, in this configuration, since an input position is detected for each electrode block, resolution is lowered and position detection accuracy is reduced compared to a configuration in which an input position is detected for each electrode.

SUMMARY

An object of the present disclosure is to provide an input detection device, an input detection method, and a recording medium recording an input detection program that are capable of improving accuracy of detecting an input position of an input operation on a display panel.

An input detection device according to an aspect of the present disclosure detects an input position of an input operation performed on a display panel by an inputter. The input detection device includes a capacitance detection processing unit, an image acquisition processing unit, and a position detection processing unit. The capacitance detection processing unit detects a change in electrostatic capacitance of the display panel due to the input operation. The image acquisition processing unit acquires a captured image from an imager that captures an image of the inputter that performs the input operation. The position detection processing unit detects the input position on the display panel, based on a change in the electrostatic capacitance detected by the capacitance detection processing unit and the captured image acquired by the image acquisition processing unit.

An input detection method according to another aspect of the present disclosure is a method of detecting an input position of an input operation performed on a display panel by an inputter. In the input detection method, one or a plurality of processors execute: detecting a change in electrostatic capacitance of the display panel due to the input operation; acquiring a captured image from an imager that captures an image of the inputter performing the input operation; and detecting the input position on the display panel, based on a change in the electrostatic capacitance and the captured image.

A recording medium according to another aspect of the present disclosure is a recording medium that records a program for detecting an input position of an input operation performed on a display panel by an inputter. The input detection program is a program for causing one or a plurality of processors to execute: detecting a change in electrostatic capacitance of the display panel due to the input operation; acquiring a captured image from an imager that captures an image of the inputter performing the input operation; and detecting the input position on the display panel, based on a change in the electrostatic capacitance and the captured image.

According to the present disclosure, there is provided an input detection device, an input detection method, and a recording medium recording an input detection program that are capable of improving accuracy of detecting an input position of an input operation on a display panel.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. Note that the following embodiment is merely an example that embodies the present disclosure, and does not intend to limit the technical scope of the present disclosure.

Figure 1:
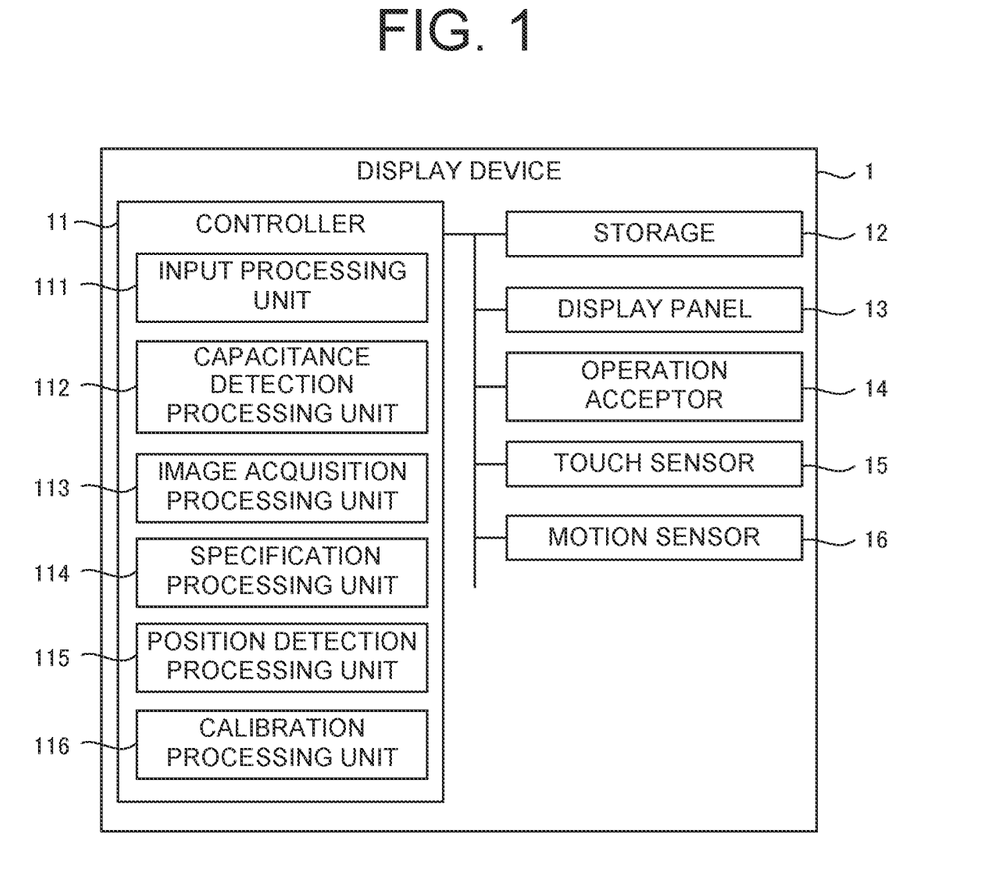
FIG. 1 is a block diagram illustrating a configuration of a display device according to an embodiment of the present disclosure.

As illustrated in FIG. 1, a display device 1 according to the embodiment of the present disclosure includes a controller 11, a storage 12, a display panel 13, an operation acceptor 14, a touch sensor 15, and a motion sensor 16.

Figure 2:
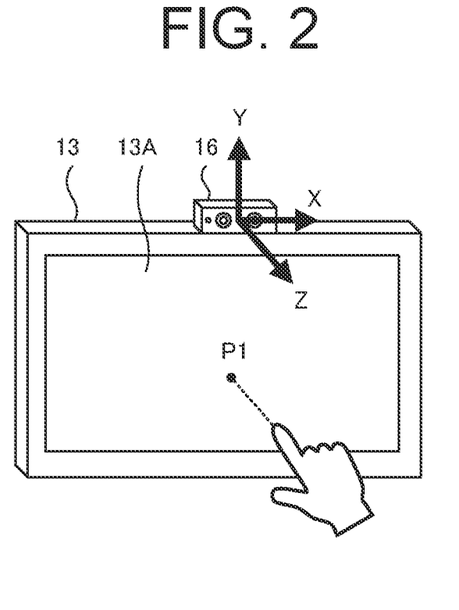
FIG. 2 is a schematic diagram illustrating an example of a hover operation on the display device according to the embodiment of the present disclosure.
Figure 3:
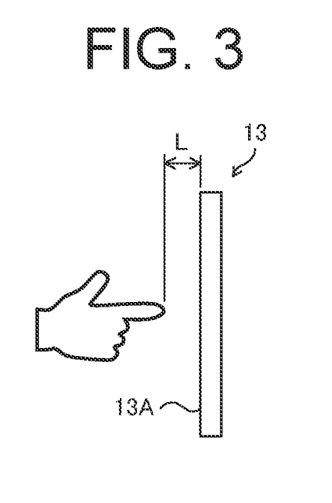
FIG. 3 is a schematic diagram illustrating an example of a hover operation on the display device according to the embodiment of the present disclosure.

The display device 1 is an electrostatic capacitive display device that accepts a non-touch input operation (hereinafter referred to as a hover operation) performed by a user on a display screen 13A of the display panel 13. For example, as illustrated in FIGS. 2 and 3, the display device 1 detects a finger of a user when the finger approaches the display screen 13A and a distance L between the finger and the display screen 13A becomes a predetermined distance or less, and detects a hover operation in accordance with a position (an input position) of the finger. Subsequently, the display device 1 executes input processing in accordance with the hover operation performed by the user on the display screen 13A. For example, when the user performs a hover operation in a predetermined position over the display screen 13A, the display device 1 detects a position on the display screen 13A corresponding to the position of the hover operation, and accepts a selection operation in which a selection target is selected using an input operation icon P1 displayed on the display screen 13A.

The hover operation refers to an operation corresponding an operation of matching the input operation icon P1 (such as a cursor) to a specific element by using an inputter (such as a user's hand, a fingertip, a stylus pen, or a support rod) for the display screen 13A, and further refers to an operation in a state before the inputter is in contact with the display screen 13A (a hover state in which the inputter is suspended in the air). The hover state refers to a state in which the distance between the inputter and the display screen 13A is less than or equal to a predetermined distance and in which the inputter is not in contact with the display screen 13A, i.e., a state in which the inputter is brought close to the display screen 13A.

Note that the display device 1 can receive an input operation by a user's touch on the display screen 13A (hereinafter referred to as a "touch operation"). A selection operation of selecting a selection target using the input operation icon P1 in response to the touch operation is a generally-known technique, and therefore, a description thereof is omitted hereinafter.

The following is a description of a specific configuration of the hover operation in the display device 1.

The display panel 13 is a display that displays an image, and an example thereof is a liquid crystal display. The operation acceptor 14 is operation equipment such as a mouse and a keyboard. Note that the operation acceptor 14 may also be composed of a touch panel.

Figure 4:
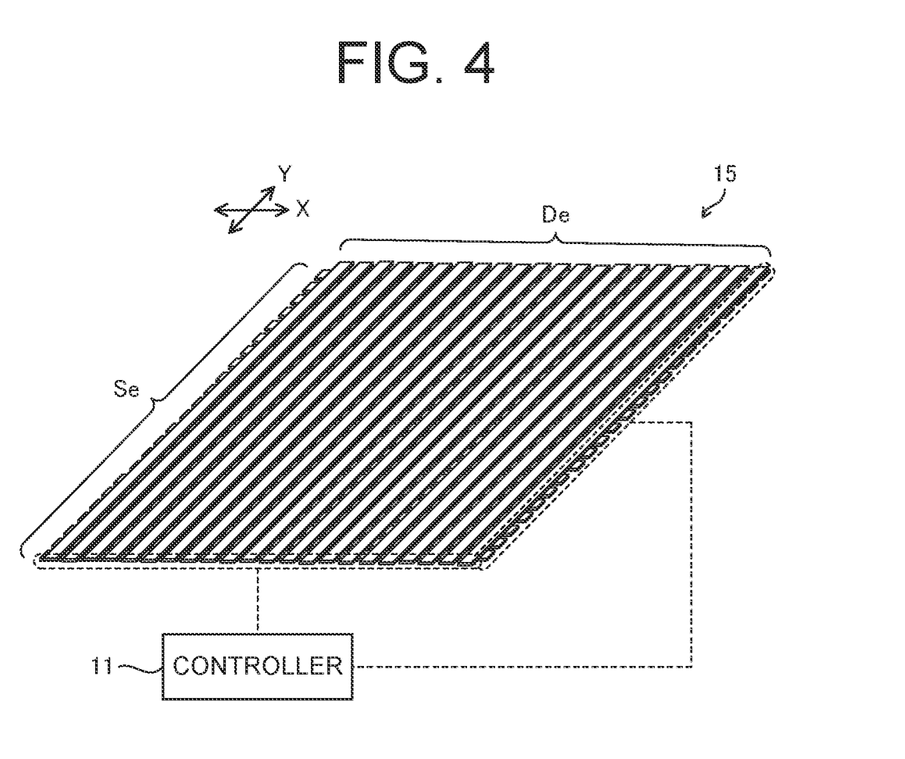
FIG. 4 is a diagram illustrating a configuration of a touch sensor according to the embodiment of the present disclosure.

The touch sensor 15 is, for example, a surface capacitive type or projected capacitive type sensor. Note that the touch sensor 15 may be composed of a touch panel superimposed on the surface of the display panel 13. FIG. 4 illustrates a configuration of the touch sensor 15. The touch sensor 15 includes a plurality of drive electrodes De (driving electrodes) arranged in an X direction and a plurality of sense electrodes Se (detection electrodes) arranged in a Y direction. The controller 11 inputs a drive signal (driving signal) to the drive electrode De, and the sense electrode Se outputs a sense signal (detection signal) to the controller 11. The sense signal corresponds to a capacitance value (electrostatic capacitance) between the drive electrode De and the sense electrode Se. The controller 11 detects an input position on the display screen 13A corresponding to the hover operation, based on a change in electrostatic capacitance corresponding to the sense signals.

For example, the motion sensor 16 includes two cameras and three infrared LEDs, and detects the input operation by the user within a predetermined detection range. The motion sensor 16 outputs detection information to the controller 11. The detection information includes position coordinates (an X coordinate, a Y coordinate, and a Z coordinate) of the inputter (such as a user's hand, a fingertip, a stylus pen, and a pointer) with the motion sensor 16 as a reference. For example, the motion sensor 16 can detect a user's hand (a right hand, a left hand, a palm, or a fist), a finger joint, a skeleton, an angle, a position of a finger of the user, and the like. A well-known technique can be applied to the motion sensor 16. The motion sensor 16 and the cameras are an example of an imager in the present disclosure.

The storage 12 is a non-volatile storage such as a hard disk drive (HDD), a solid state drive (SSD), or a flash memory, which stores various types of information. The storage 12 stores a control program, such as an input detection program for causing the controller 11 to execute input detection processing (refer to FIGS. 7 and 9) to be described later. For example, the input detection program is recorded in a non-transitory manner in a computer-readable recording medium, such as a CD or a DVD, is read by a reader (not illustrated), such as a CD drive or a DVD drive, provided in the display device 1, and is stored in the storage 12. The input detection program may be distributed from a cloud server and stored in the storage 12.

The controller 11 has control equipment such as a CPU, a ROM, and a RAM. The CPU is a processor that executes various types of arithmetic processing. The ROM is a non-volatile storage in which control programs such as a BIOS and an OS for causing the CPU to execute various types of arithmetic processing are stored in advance. The RAM is a volatile or non-volatile storage that stores various types of information, and is used as temporary storage memory (a work area) for various types of processing to be executed by the CPU. Further, the controller 11 causes the CPU to execute the various control programs, which are stored in advance in the ROM or the storage 12, thereby controlling the display device 1.

The controller 11 detects an input position of an input operation by an inputter on the display panel 13. Specifically, as illustrated in FIG. 1, the controller 11 includes various processing units, such as an input processing unit 111, a capacitance detection processing unit 112, an image acquisition processing unit 113, a specification processing unit 114, a position detection processing unit 115, and an a calibration processing unit 116. Note that the controller 11 functions as the input processing unit 111, the capacitance detection processing unit 112, the image acquisition processing unit 113, the specification processing unit 114, the position detection processing unit 115, and the calibration processing unit 116, when the CPU executes the input detection program and various types of processing according to the input detection program. Furthermore, some or all of the processing units included in the controller 11 may be composed of an electronic circuit. The input detection program may be a program for causing a plurality of processors to function as the various processing units.

The input processing unit 111 inputs a drive signal (driving signal) to the touch sensor 15. Specifically, the input processing unit 111 successively inputs a drive signal to each of the drive electrodes De of the touch sensor 15.

The capacitance detection processing unit 112 detects a change in electrostatic capacitance occurring between the inputter that performs the input operation and the display screen 13A. For example, the capacitance detection processing unit 112 receives a sense signal being output from the sense electrode Se in response to the drive signal being input to the drive electrode De, and detects an amount of change in electrostatic capacitance, based on the sense signal.

An image acquisition processing unit 113 acquires a captured image from a camera for capturing an image of the inputter that performs the input operation. Specifically, when the camera of the motion sensor 16 captures an image of a predetermined detection range, the camera transmits the captured image to the controller 11. The image acquisition processing unit 113 acquires the captured image from the camera. For example, the image acquisition processing unit 113 sequentially acquires captured images, which are transmitted from the camera at a predetermined frame rate. The camera may transmit the captured image when the motion sensor 16 detects the inputter within the detection range.

The specification processing unit 114 specifies a position of the inputter with respect to the display screen 13A, a shape of the inputter, and the like, based on the captured image acquired by the image acquisition processing unit 113. For example, the specification processing unit 114 specifies the position coordinates (X coordinate, Y coordinate, and Z coordinate) of the inputter, based on detection information of the motion sensor 16. The specification processing unit 114 analyzes the captured image and specifies the shape of the inputter (for example, the shape of a hand).

The position detection processing unit 115 detects an input position on the display screen 13A, based on the change in electrostatic capacitance, which is detected by the capacitance detection processing unit 112, and the captured image acquired by the image acquisition processing unit 113. A specific detection method of the input position will be described later.

When the input position is detected by the position detection processing unit 115, the controller 11 executes input processing in accordance with the input operation by the user on the detected input position. For example, the controller 11 moves the input operation icon P1 or selects a selection target by the input operation icon P1, in response to the input position.

The calibration processing unit 116 executes calibration processing of removing noise of the display panel 13 and smoothing a capacitance distribution indicating a change in electrostatic capacitance of the display panel 13. A specific example of the calibration processing will be described later.

Figure 5:
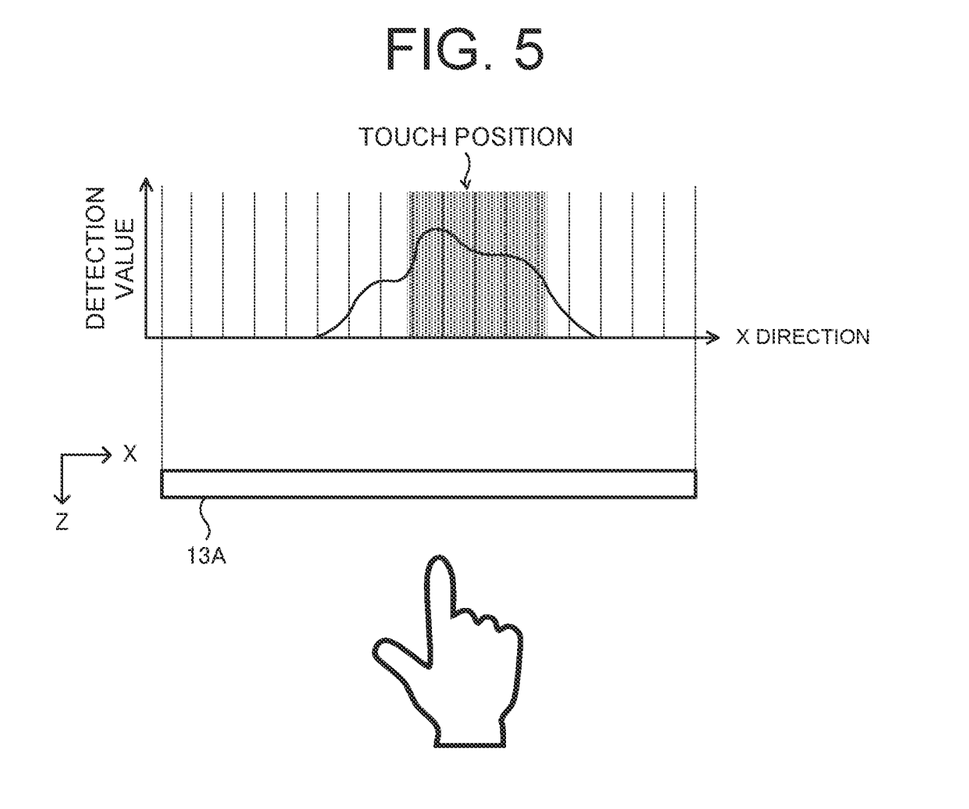
FIG. 5 is a schematic diagram illustrating an example of a detection method of an input position in a conventional display device.

Herein, a method of detecting an input position in a conventional display device will be described with reference to FIG. 5. FIG. 5 illustrates the display panel 13 as viewed from above. FIG. 5 further illustrates a change in electrostatic capacitance (detected value). Herein, a user's hand will be described as an example of the inputter.

As illustrated in FIG. 5, in the conventional detection method, for example, when a user extends an index finger and brings user's hand close to the display screen 13A, the electrostatic capacitance changes depending on the distance between each portion of the hand and the display screen 13A. For example, the electrostatic capacitance changes in a range of the entire hand. Thus, the range in which the change in electrostatic capacitance is equal to or greater than a predetermined value is widened. Therefore, there is a possibility that the detected input position (touch position) varies in the range and is erroneously detected, and therefore, the position detection accuracy is lowered.

In contrast, as described below, the display device 1 according to the present embodiment has a configuration capable of improving detection accuracy of the input position of the input operation on the display panel 13. Specific examples (a first configuration example and a second configuration example) of the input position detection method according to the present embodiment will be described below.

First Configuration Example

A display device 1 according to the first configuration example has a configuration in which a portion where a change in electrostatic capacitance is detected is specified, based on the shape of the inputter, and an input position is detected based on a change in electrostatic capacitance of the specified portion. Namely, the display device 1 according to the first configuration example sets the change in capacitance of each portion to be valid or invalid in response to the shape of the inputter.

To be specific, the specification processing unit 114 specifies a first portion closest to the display panel 13 (the display screen 13A) in the inputter and a second portion farther from the display screen 13A than the first portion in the inputter, based on the captured image. The position detection processing unit 115 detects an input position on the display screen 13A, based on a change in electrostatic capacitance corresponding to the first portion.

Figure 6:
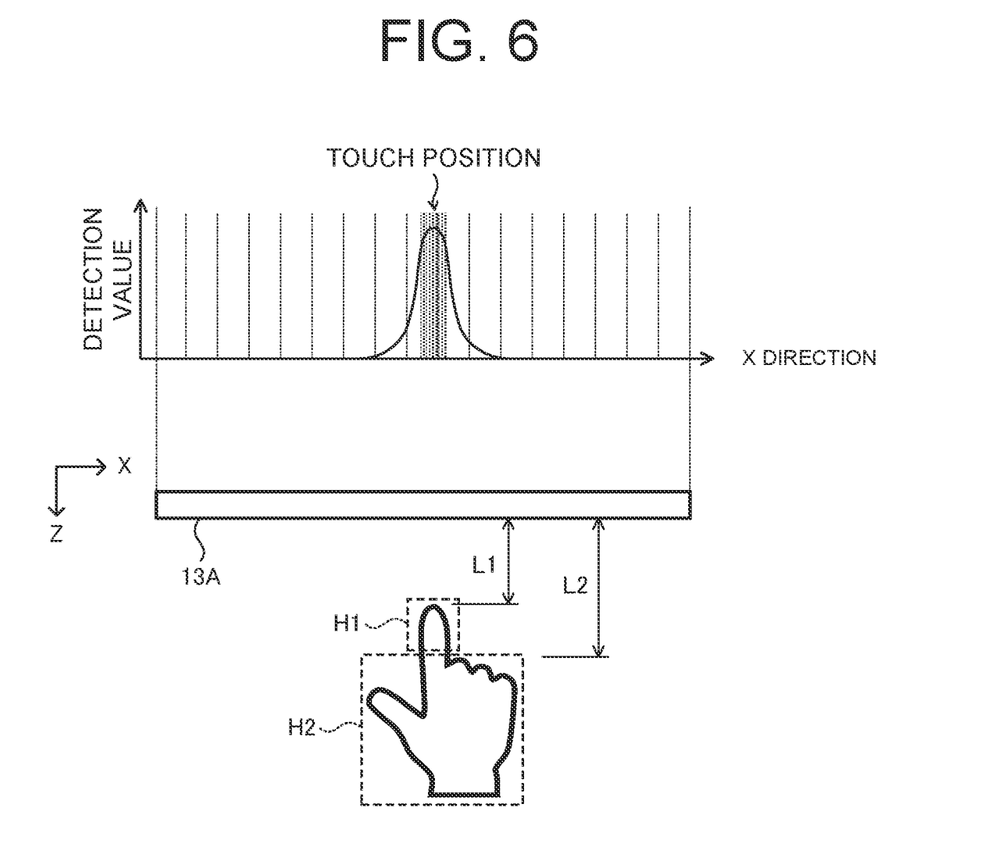
FIG. 6 is a schematic diagram illustrating an example of a detection method of an input position in a display device according to a first configuration example of the embodiment of the present disclosure.

For example, as illustrated in FIG. 6, the specification processing unit 114 specifies a fingertip part H1 (first portion) of the hand of the user at a distance L1 closest to the display screen 13A, and a first part H2 (second portion) of the hand of the user at a distance L2 farther from the display screen 13A than the fingertip part H1. Further, the specification processing unit 114 specifies the positions (coordinates) of the fingertip part H1 and the first part H2, based on the captured image and detection information of the motion sensor 16. The position detection processing unit 115 detects an input position on the display screen 13A, based on a change in electrostatic capacitance corresponding to the fingertip part H1.

To be more specific, the position detection processing unit 115 cancels a change in electrostatic capacitance corresponding to the first part H2, and detects the input position on the display screen 13A, based on only the change in electrostatic capacitance corresponding to the fingertip part H1. For example, the position detection processing unit 115 cancels a change in electrostatic capacitance of electrodes (the drive electrodes De and the sense electrodes Se) corresponding to the position of the first part H2, and detects the input position on the display screen 13A, based on only a change in electrostatic capacitance of electrodes (the drive electrodes De and the sense electrodes Se) corresponding to the position of the fingertip part H1. When the change in electrostatic capacitance corresponding to the first part H2 is cancelled, as illustrated in FIG. 6, only the change in electrostatic capacitance corresponding to the fingertip part H1 is detected. For this reason, since a range of the distribution of the change in electrostatic capacitance becomes narrow (steep), a variation in the input position (touch position) to be detected becomes small. Therefore, the detection accuracy of the input position (touch position) can be improved.

Input Detection Processing of First Configuration Example

Figure 7:
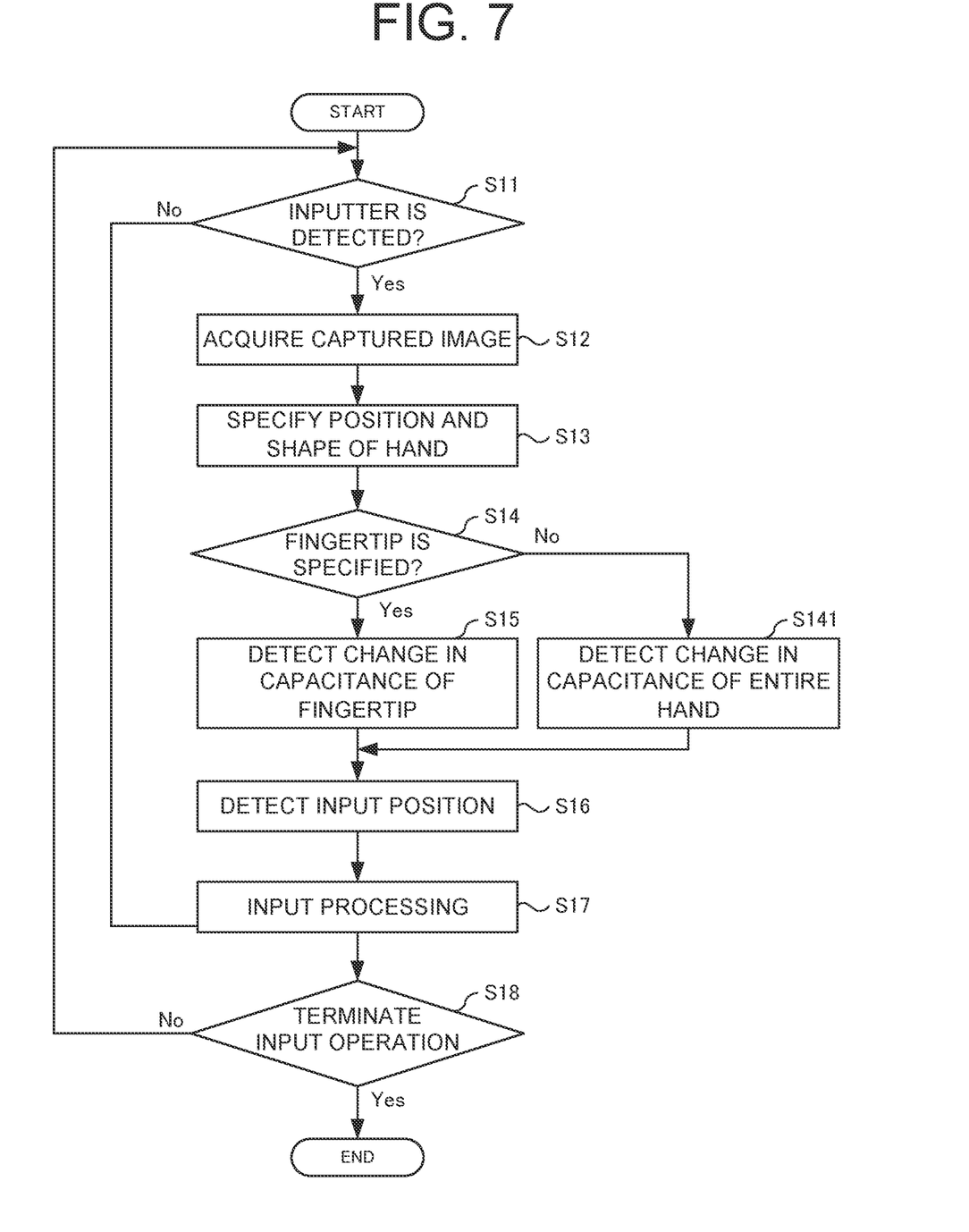
FIG. 7 is a flowchart for describing an example of a procedure of input detection processing to be executed in the display device according to the first configuration example of the embodiment of the present disclosure.

Hereinafter, input detection processing of the first configuration example, which is executed by the controller 11 of the display device 1, will be described with reference to FIG. 7.

Note that the present disclosure can be regarded as a disclosure of an input detection method (an example of an input detection method in the present disclosure) for executing one or a plurality of steps included in the input detection processing, and one or a plurality of steps included in the input detection processing described herein may be omitted as appropriate. Note that the steps of the input detection processing may be executed in a different order as long as the similar function effect is generated. Furthermore, a description will be made herein on a case where the controller 11 executes the steps in the input detection processing as an example. However, an input detection method in which a plurality of processors execute the steps in the input detection processing in a distributed manner is also regarded as another embodiment.

First, in step S11, the controller 11 determines whether or not the inputter has been detected. For example, when the hand of the user appears in front of the display screen 13A (a detection range), the controller 11 detects the inputter, based on the detection information of the motion sensor 16. In addition, the controller 11 may detect the inputter, based on a change in electrostatic capacitance. When the inputter is detected (S11: Yes), the controller 11 shifts the processing to step S12. The controller 11 is on standby until the inputter is detected (S11: no).

In step S12, the controller 11 acquires a captured image. To be specific, the controller 11 acquires a captured image acquired by capturing an image of a predetermined detection range in front of the display screen 13A from the camera.

Next, in step S13, the controller 11 analyzes the captured image and specifies a position (coordinates) and a shape of the inputter (herein, a hand).

Next, in step S14, the controller 11 determines whether or not a fingertip (fingertip part H1 (refer to FIG. 6)) is specified in the specified hand. When the fingertip is specified (S14: Yes), the controller 11 causes the processing to proceed to step S15. On the other hand, when the fingertip cannot be specified (S14: No), the controller 11 causes the processing to proceed to step S141.

When the inputter is an object (a stylus pen, a support rod, etc.) different from the hand, the controller 11 specifies a portion (e.g., a pen tip or a stick tip) closest to the display screen 13A in the inputter.

In step S15, the controller 11 detects a change in capacitance of the specified fingertip part H1. For example, as illustrated in FIG. 6, the controller 11 cancels the change in capacitance of the electrodes (the drive electrodes De and the sense electrodes Se) corresponding to the position of the first part H2, and detects only the change in capacitance of the electrodes (the drive electrodes De and the sense electrodes Se) corresponding to the position of the fingertip part H1. After step S15, the controller 11 causes the processing to proceed to step S16.

On the other hand, in step S141, the controller 11 detects a change in electrostatic capacitance of the entire specified hand. For example, as illustrated in FIG. 5, the controller 11 detects a change in electrostatic capacitance of the electrodes (the drive electrodes De and the sense electrodes Se) corresponding to the position of the entire hand. After step S141, the controller 11 shifts the processing to step S16.

In step S16, the controller 11 detects the input position of the inputter (hand). For example, when the fingertip part H1 is specified (S14: Yes), the controller 11 detects the input position on the display screen 13A, based on only the change in electrostatic capacitance of the electrodes (the drive electrodes De and the sense electrodes Se) corresponding to the position of the fingertip part H1 (refer to FIG. 6). On the other hand, when the fingertip part H1 cannot be specified (S14: No), the controller 11 detects the input position on the display screen 13A, based on the change in electrostatic capacitance of the electrodes (the drive electrodes De and the sense electrodes Se) corresponding to the position of the entire hand (refer to FIG. 5).

Then, in step S17, the controller 11 executes input processing. For example, the controller 11 moves an input operation icon P1 or selects a selection target by the input operation icon P1, in response to the detected input position.

Subsequently, in step S18, the controller 11 determines whether or not the input operation has been terminated. When the user terminates the input operation performed on the display screen 13A, the controller 11 determines that the input operation has been terminated (S18: Yes), and terminates the input detection processing. On the other hand, when the user continues the input operation performed on the display screen 13A, the controller 11 determines that the input operation has not been terminated (S18: No), and shifts the processing to step S11. The controller 11 thus executes the input detection processing according to the first configuration example.

As described above, the display device 1 according to the first configuration example specifies the position of the inputter with respect to the display panel 13 and the shape of the inputter, based on the captured image, and specifies the first portion closest to the display panel 13 in the specified inputter and the second portion farther from the display panel 13 than the first portion in the inputter. Then, the display device 1 detects the input position on the display panel 13, based on the change in electrostatic capacitance corresponding to the first portion. Further, the display device 1 cancels the change in electrostatic capacitance corresponding to the second portion, and detects the input position on the display panel 13, based on only the change in electrostatic capacitance corresponding to the first portion.

According to the first configuration example, for example, when the user extends the finger and brings the hand close to the display panel 13, the input position can be detected in response to the position of the fingertip, and thus the position intended by the user can be accurately detected. Therefore, the position detection accuracy can be improved. In addition, according to the first configuration example, since it is possible to detect the input position with high accuracy without forming an electrode block in which a plurality of electrodes (drive electrodes) are connected to each other, it is also possible to prevent a decrease in resolution.

Second Configuration Example

A display device 1 according to the second configuration example has a configuration in which a determination area for determining a change in electrostatic capacitance is set based on a position of an inputter, and an input position is detected based on a change in electrostatic capacitance in the set determination area. Namely, the display device 1 according to the second configuration example executes local driving for switching a driving position of an electrode, depending on the position of the inputter.

To be more specific, the specification processing unit 114 specifies a position of the inputter with respect to the display screen 13A, based on the captured image. The position detection processing unit 115 sets a determination area of the display screen 13A corresponding to the position of the inputter specified by the specification processing unit 114, and detects an input position on the display screen 13A, based on a change in electrostatic capacitance of the determination area.

Figure 8:
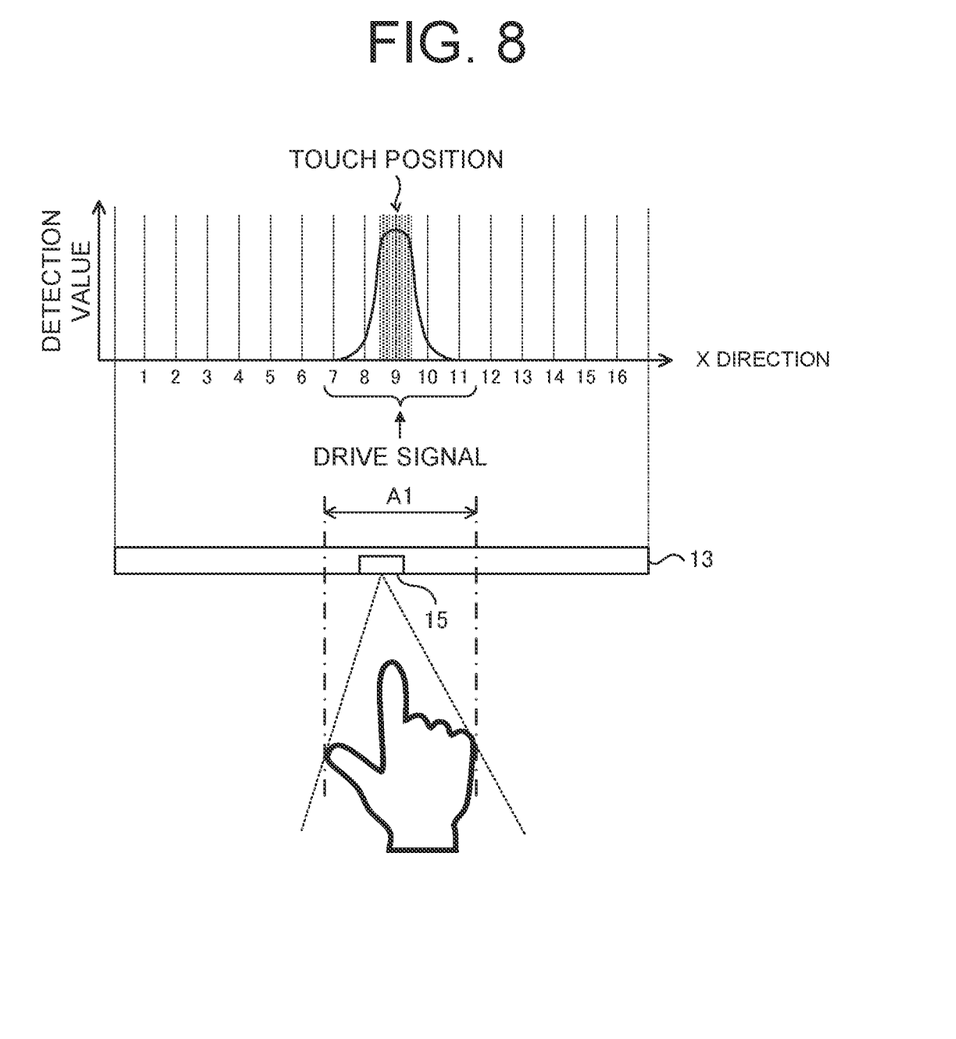
FIG. 8 is a schematic diagram illustrating an example of a detection method of an input position in a display device according to a second configuration example of the embodiment of the present disclosure.

For example, as illustrated in FIG. 8, when a position of a hand of a user is specified, the specification processing unit 114 sets a determination area A1 of the display screen 13A corresponding to the position. The position detection processing unit 115 detects an input position on the display screen 13A, based on a change in electrostatic capacitance of the determination area A1.

To be more specific, the input processing unit 111 drives first drive electrodes De (an example of the first electrodes of the present disclosure) included in the determination area A1 among a plurality of drive electrodes De, and stops driving of second drive electrodes De (an example of the second electrodes of the present disclosure) not included in the determination area A1 among the plurality of drive electrodes De. Namely, the input processing unit 111 inputs a drive signal to the first drive electrode De. In the example of FIG. 8, the input processing unit 111 inputs a drive signal to the seventh to eleventh drive electrodes De (first drive electrodes De) included in the determination area A1, and does not input the drive signal to the first to sixth and twelfth to sixteenth drive electrodes De (second drive electrodes De) not included in the determination area A1. The position detection processing unit 115 detects an input position on the display screen 13A, based on a change in electrostatic capacitance corresponding to the first drive electrodes De.

Input Detection Processing of Second Configuration Example

Figure 9:
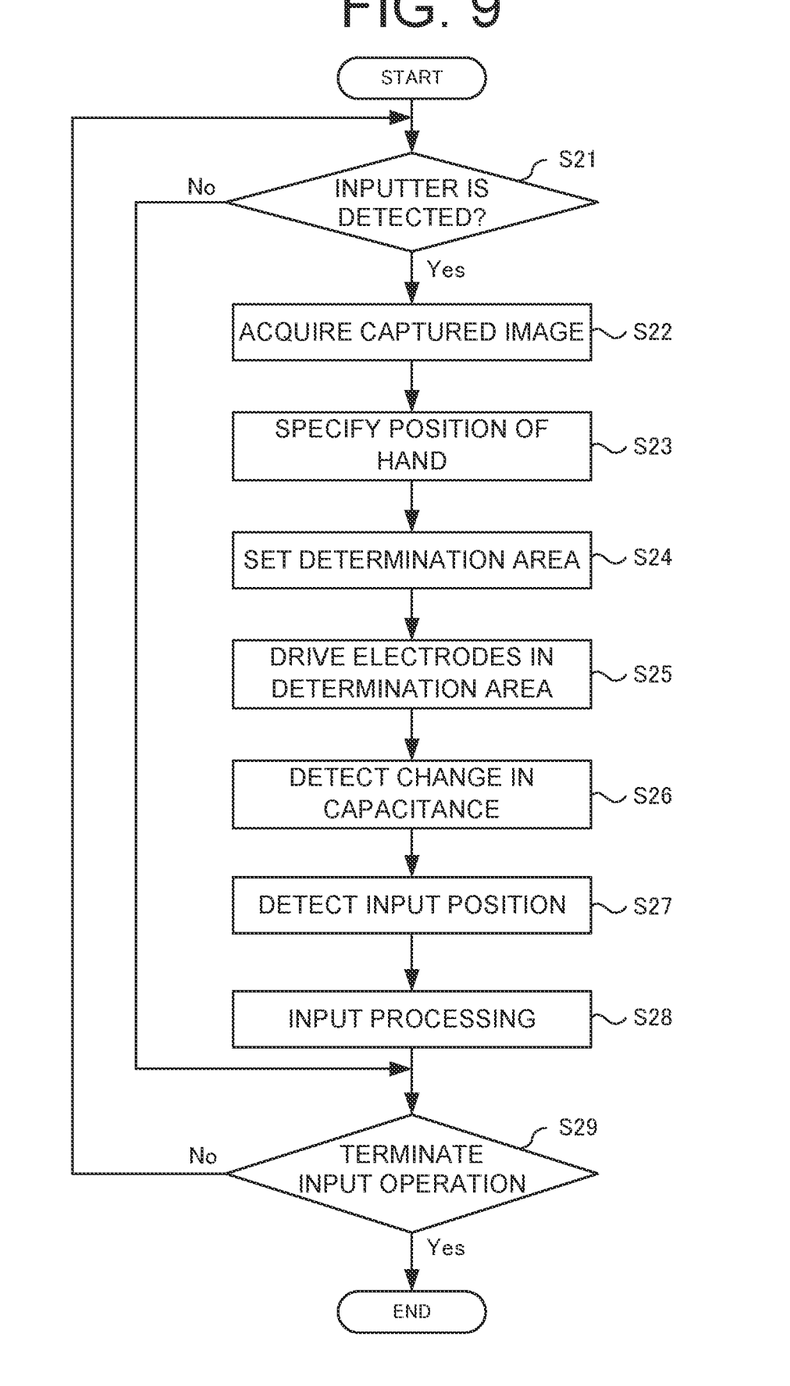
FIG. 9 is a flowchart for describing an example of a procedure of input detection processing to be executed in the display device according to the second configuration example of the embodiment of the present disclosure.

Hereinafter, input detection processing of the second configuration example, which is executed by the controller 11 of the display device 1, will be described with reference to FIG. 9.

First, in step S21, the controller 11 determines whether or not an inputter has been detected. For example, when the hand of the user appears in front of the display screen 13A, the controller 11 detects the inputter, based on detection information of the motion sensor 16. In addition, the controller 11 may detect the inputter, based on a change in electrostatic capacitance. When the inputter is detected (S21: Yes), the controller 11 shifts the processing to step S22. The controller 11 is on standby until the inputter is detected (S21: No).

In step S22, the controller 11 acquires a captured image. To be specific, the controller 11 acquires a captured image acquired by capturing an image of a predetermined detection range in front of the display screen 13A from the camera.

Next, in step S23, the controller 11 analyzes the captured image and specifies a position (coordinates) of the inputter (herein, the hand).

Next, in step S24, the controller 11 sets a determination area A1 corresponding to the specified position of the hand. For example, as illustrated in FIG. 8, the controller 11 sets a determination area A1 having the entire width of the hand. In addition, the controller 11 sets the entire width of the hand in an arrangement direction (X direction in FIG. 8) of the drive electrodes De as the determination area A1.

As another embodiment, in a case where a shape of the hand is specified, the controller 11 may set a width of a part of the hand, for example, a portion (fingertip) closest to the display screen 13A as the determination area A1.

Next, in step S25, the controller 11 drives first drive electrodes De included in the determination area A1. In the example illustrated in FIG. 8, the controller 11 inputs a drive signal to the seventh to eleventh drive electrodes De.

Next, in step S26, the controller 11 detects a change in electrostatic capacitance of the determination area A1. In the example illustrated in FIG. 8, the controller 11 detects a change in electrostatic capacitance corresponding to the seventh to eleventh drive electrodes De.

Next, in step S27, the controller 11 detects an input position of the inputter (hand). For example, the controller 11 detects an input position on the display screen 13A, based on a change in electrostatic capacitance corresponding to the seventh to eleventh drive electrodes De (refer to FIG. 8).

Then, in step S28, the controller 11 executes input processing. For example, the controller 11 moves an input operation icon P1 or selects a selection target by the input operation icon P1, in response to the detected input position.

Subsequently, in step S29, the controller 11 determines whether or not the input operation has been terminated. When the user terminates the input operation performed on the display screen 13A, the controller 11 determines that the input operation has been terminated (S29: Yes), and terminates the input detection processing. On the other hand, when the user continues the input operation on the display screen 13A, the controller 11 determines that the input operation has not been terminated (S29: No), and shifts the processing to step S21. The controller 11 thus executes the input detection processing according to the second configuration example.

As described above, the display device 1 according to the second configuration example specifies a position of the inputter with respect to the display panel 13, based on the captured image, sets the determination area A1 of the display panel 13 corresponding to the specified position of the inputter, and detects the input position on the display panel 13, based on a change in electrostatic capacitance of the determination area A1. The display device 1 drives first electrodes (first drive electrodes De) included in the determination area A1 among a plurality of electrodes (drive electrodes De) arranged on the display panel 13, stops driving of second electrodes (second drive electrodes De) not included in the determination area A1, and detects an input position on the display panel 13, based on a change in electrostatic capacitance corresponding to the first electrodes.

According to the second configuration example, for example, when the user brings the hand close to the display panel 13, a range of the detection target (the determination area A1) for detecting the input position is set according to the position of the hand, and the input position can be detected by focusing on the determination area A1. Therefore, the position intended by the user can be accurately detected. Therefore, the position detection accuracy can be improved. Further, a detection speed can be improved.

Further, similarly to the first configuration example, according to the second configuration example, since it is possible to detect the input position with high accuracy without forming an electrode block, it is also possible to prevent a decrease in resolution.

The display device 1 according to the present embodiment may include the first configuration example and the second configuration example described above, and may be capable of switching between the first configuration example and the second configuration example. For example, the controller 11 switches mutually between a first driving mode of the first configuration example and a second driving mode of the second configuration example, in response to a gesture operation of the user. For example, when the motion sensor 16 detects a first gesture operation of the user, the controller 11 sets the driving mode to the first driving mode, and when the motion sensor 16 detects a second gesture operation of the user, the controller 11 sets the driving mode to the second driving mode.

Calibration Processing

Incidentally, the electrostatic capacitance of the display screen 13A always continues to fluctuate due to noise or the like even in a state where the inputter is not present near the display screen 13A or in a state where the inputter is not in contact with the display screen 13A. When the fluctuation in electrostatic capacitance gradually increases, an input position may be erroneously detected (erroneously touched), or no response may be made when an input operation (touch) is performed. Therefore, it is necessary to appropriately perform initialization (calibration by smoothing processing) of the electrostatic capacitance of the entire display screen 13A.

Therefore, in the display device 1 according to the present embodiment, the calibration processing unit 116 performs calibration processing of smoothing a capacitance distribution indicating a change in electrostatic capacitance of the display panel 13.

For example, the calibration processing unit 116 executes the calibration processing when a distance between the display panel 13 and the inputter is equal to or greater than a threshold value, and does not execute the calibration processing when the distance is less than the threshold value. In addition, the calibration processing unit 116 may execute the calibration processing when the distance is equal to or greater than a threshold value and a predetermined time elapses after the distance becomes equal to or greater than the threshold value.

For example, the calibration processing unit 116 can calculate the distance between the display panel 13 and the inputter, based on the captured image. Further, the threshold value is set to, for example, a distance at which the inputter (such as the hand of the user) does not affect the change in electrostatic capacitance. When the inputter is separated from the display screen 13A by a distance equal to or greater than the threshold value, the capacitance distribution can be smoothed in a state where the inputter is not detected (in a state where there is no change in electrostatic capacitance due to the inputter). Further, according to the configuration in which the calibration processing is executed on the condition that a predetermined time has elapsed after the distance becomes equal to or greater than the threshold value, it is possible to reliably eliminate the influence of the change in electrostatic capacitance due to the inputter. Accordingly, it is possible to prevent the capacitance distribution from being smoothed in a state where the inputter is detected. In addition, since a noise of the display panel 13 can be reliably removed, erroneous detection of the input position can be prevented, and the position detection accuracy can be improved.

Other Embodiments

In the above-described embodiment, the display device 1 includes a camera. However, as another embodiment, a display device 1 may omit a camera and include a position detection function of an infrared (IR) system. In the infrared system, light emitting elements and light receiving elements for infrared rays are built in the periphery of a display panel 13, and an input position is detected by infrared rays that are blocked when the display screen 13A is touched or approached.

In this way, by using both the electrostatic capacitance system and the infrared system, it is possible to improve detection accuracy of the input position of the hover operation. In addition, it is possible to reduce power consumption by stopping driving of the infrared rays except when the electrostatic capacitance is detected. Therefore, according to the configuration, it is possible to achieve the display device 1 with low power consumption, which can detect the input position of the hover operation with high accuracy.

The display device 1 according to the present embodiment is an example of an input detection device of the present disclosure. In addition, the input detection device of the present disclosure may be the controller 11 (control device) or a server including the controller 11.

Supplementary Notes of Disclosure

Hereinafter, summary of the disclosure extracted from the embodiments described above will be added. Configurations and processing functions to be described in the following supplementary notes can be selected and arbitrarily combined.

Supplementary Note 1

An input detection device that detects an input position of an input operation performed on a display panel by an inputter, the input detection device including:
　a capacitance detection processing circuit that detects a change in electrostatic capacitance of the display panel due to the input operation;
　an image acquisition processing circuit that acquires a captured image from an imager that captures an image of the inputter that performs the input operation; and
　a position detection processing circuit that detects the input position on the display panel, based on a change in the electrostatic capacitance being detected by the capacitance detection processing circuit and the captured image being acquired by the image acquisition processing circuit.

Supplementary Note 2

The input detection device according to Supplementary Note 1, further including
　a specification processing circuit that specifies a position of the inputter with respect to the display panel and a shape of the inputter, based on the captured image, wherein,
　when the specification processing circuit specifies a first portion closest to the display panel in the inputter and a second portion farther from the display panel than the first portion in the inputter, the position detection processing circuit detects the input position on the display panel, based on a change in the electrostatic capacitance corresponding to the first portion.

Supplementary Note 3

The input detection device according to Supplementary Note 2, wherein
the position detection processing circuit cancels a change in the electrostatic capacitance corresponding to the second portion and detects the input position on the display panel, based on only a change in the electrostatic capacitance corresponding to the first portion.

Supplementary Note 4

The input detection device according to any one of Supplementary Notes 1 to 3, further including
a specification processing circuit that specifies a position of the inputter with respect to the display panel, based on the captured image, wherein
the position detection processing circuit sets a determination area of the display panel corresponding to a position of the inputter specified by the specification processing circuit, and detects the input position on the display panel, based on a change in the electrostatic capacitance of the determination area.

Supplementary Note 5

The input detection device according to Supplementary Note 4, wherein
a first electrode included in the determination area among a plurality of electrodes arranged on the display panel is driven, driving of a second electrode not included in the determination area among the plurality of electrodes is stopped, and the input position on the display panel is detected based on a change in the electrostatic capacitance corresponding to the first electrode.

Supplementary Note 6

The input detection device according to any one of Supplementary Notes 1 to 5, further including
a calibration processing circuit that executes calibration processing of removing noise of the display panel and smoothing a capacitance distribution indicating a change in electrostatic capacitance of the display panel, wherein
the calibration processing circuit executes the calibration processing when a distance between the display panel and the inputter is equal to or greater than a threshold value, and does not execute the calibration processing when the distance is less than the threshold value.

Supplementary Note 7

The input detection device according to Supplementary Note 6, wherein
the calibration processing circuit executes the calibration processing in a case where the distance is equal to or greater than the threshold value and a predetermined time elapses after the distance becomes equal to or greater than the threshold value.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An input detection device comprising one or more processors, the input detection device being a meeting information management system that detects an input position of an input operation performed on a display panel by an inputter, wherein the one or more processors are configured to:
    detect a change in electrostatic capacitance of the display panel due to the input operation;
    acquire a captured image from an imager that captures an image of the inputter that performs the input operation;
    detect the input position on the display panel based on the change in the electrostatic capacitance of the display panel and the captured image;
    specify a position of the inputter with respect to the display panel based on the captured image;
    set a determination area of the display panel corresponding to the specified position of the inputter; and
    detect the input position on the display panel further based on a change in electrostatic capacitance of the determination area.

2. The input detection device according to claim 1, wherein the one or more processors are further configured to:
    drive a first electrode included in the determination area among a plurality of electrodes arranged on the display panel;
    stop driving a second electrode not included in the determination area among the plurality of electrodes; and
    detect the input position on the display panel further based on a change in electrostatic capacitance of the first electrode.

3. The input detection device according to claim 1, wherein the one or more processors are further configured to:
    execute calibration processing of removing noise of the display panel and smoothing a capacitance distribution indicating the change in electrostatic capacitance of the display panel when a distance between the display panel and the inputter is equal to or greater than a threshold value; and
    forgo executing the calibration processing when the distance is less than the threshold value.

4. The input detection device according to claim 3, wherein the one or more processors are further configured to execute the calibration processing when the distance is equal to or greater than the threshold value and a predetermined time elapses after the distance becomes equal to or greater than the threshold value.

5. An input detection method of detecting an input position of an input operation performed on a display panel by an inputter, the input detection method comprising:
    detecting a change in electrostatic capacitance of the display panel due to the input operation;
    acquiring a captured image from an imager that captures an image of the inputter performing the input operation;
    detecting the input position on the display panel based on the change in the electrostatic capacitance of the display panel and the captured image;
    specifying a position of the inputter with respect to the display panel based on the captured image;
    setting a determination area of the display panel corresponding to the specified position of the inputter; and detecting the input position on the display panel further based on a change in electrostatic capacitance of the determination area.

6. A non-transitory computer-readable recording medium recording an input detection program for detecting an input position of an input operation performed on a display panel by an inputter, the input detection program causing one or more processors to:
  detect a change in electrostatic capacitance of the display panel due to the input operation;
  acquire a captured image from an imager that captures an image of the inputter that performs the input operation;
  detect the input position on the display panel based on the change in the electrostatic capacitance of the display panel and the captured image;
  specify a position of the inputter with respect to the display panel based on the captured image;
  setting a determination area of the display panel corresponding to the specified position of the inputter; and
  detecting the input position on the display panel further based on a change in electrostatic capacitance of the determination area.

\* \* \* \* \*